Aug. 29, 1967    TERUEI HARA    3,338,490
FILM DRIVING MEANS FOR A CINE-PROJECTOR
Filed June 18, 1965    3 Sheets-Sheet 1

INVENTOR.
TERUEI HARA
BY
Buckman and Archer
HIS ATTORNEY

INVENTOR.
TERUEI HARA
BY
Buckman and Archer
HIS ATTORNEY

United States Patent Office 3,338,490
Patented Aug. 29, 1967

3,338,490
FILM DRIVING MEANS FOR A CINE-PROJECTOR
Teruei Hara, 1206 Mimuro, Urawa-shi,
Saitama-ken, Japan
Filed June 18, 1965, Ser. No. 465,013
Claims priority, application Japan, Oct. 2, 1964,
39/55,920; Oct. 12, 1964, 39/58,091
6 Claims. (Cl. 226—64)

ABSTRACT OF THE DISCLOSURE

A film driving apparatus adjustable to provide different swing amplitudes of the driving arm and different pitch on the sprocket means in order to use the apparatus with films having different perforation sizes and locations.

The present invention relates to a film driving means for a cine-projector, and more particularly to a means that can be used with different types of films having different perforations.

Recently, in order to obtain an enlarged frame area, there has been developed a new type of movie film in which a series of perforations are displaced toward a side edge and located with larger spacing as compared with an ordinary film. Such an improved film will be called hereinafter an "enlarged frame film."

Such "enlarged frame film" includes a series of perforations which are, as compared with those of the ordinary film, smaller in width, displaced transversely toward a side edge of the film and located with increased spacings. In case of typical new 8 mm. movie film, for example, the amount of said transverse displacement of the perforations is 0.9 mm. and the spacing thereof is 0.4 mm. larger than that of the ordinary film resulting in about 50% increase in the frame area. This requires a new cine-projector with a provision of a film driving mechanism for the new perforations.

Therefore, it is an object of the present invention to provide an adjustable film driving means for a cine-projector which can be accommodated to both types of films.

In order that the present invention may be more clearly understood, it will now be described with reference to the accompanying drawings, in which.

Figure 1A:
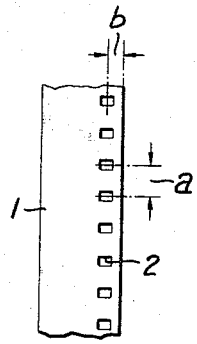
FIG. 1a is a plan view of a conventional 8 mm. movie film.
Figure 1B:
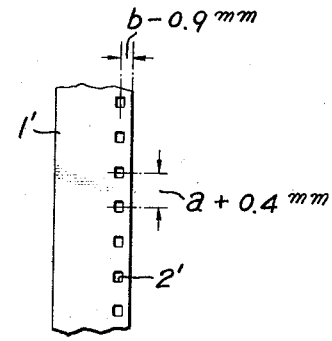
FIG. 1b is a plan view of a typical enlarged frame film.

As shown in FIG. 1a, the ordinary 8 mm. movie film 1 is formed with a series of perforations 2 which are arranged with equal spacings $a$ and a distance $b$ between the center line of the series and the adjacent side edge of the film, whereas as shown in FIG. 1b, said spacing $a$ is increased by 0.4 mm. and said distance $b$ is decreased by 0.9 mm. in the enlarged frame film 1'.

In accordance with the present invention, in order to accommodate either type of above-mentioned film, the film driving means for a cine-projector is provided with an adjusting means having an operating lever 4 pivoted on the casing 9 at the point 3. The lever 4 has at its outer end a handling knob 5 and at is opposite end an intermittent film driving arm 6 pivotally mounted thereon. The arm 6 is secured on the lever 4 for pivotal movement about the axis 7 at its one end as described, and has a claw 6a at the other end which successively engages with preforations 2 or 2' of the film 1 or 1' to drive the film intermittently in response to the swing movement of the arm 6. The arm 6 has a curved or sloped edge portion 6b which engages with a cam disc 8. The disc 8 is fixed on the rotatable shaft 8a and continuously driven by a suitable power source (not shown in the drawings) giving reciprocating swing movements to the arm 6.

Figure 2:
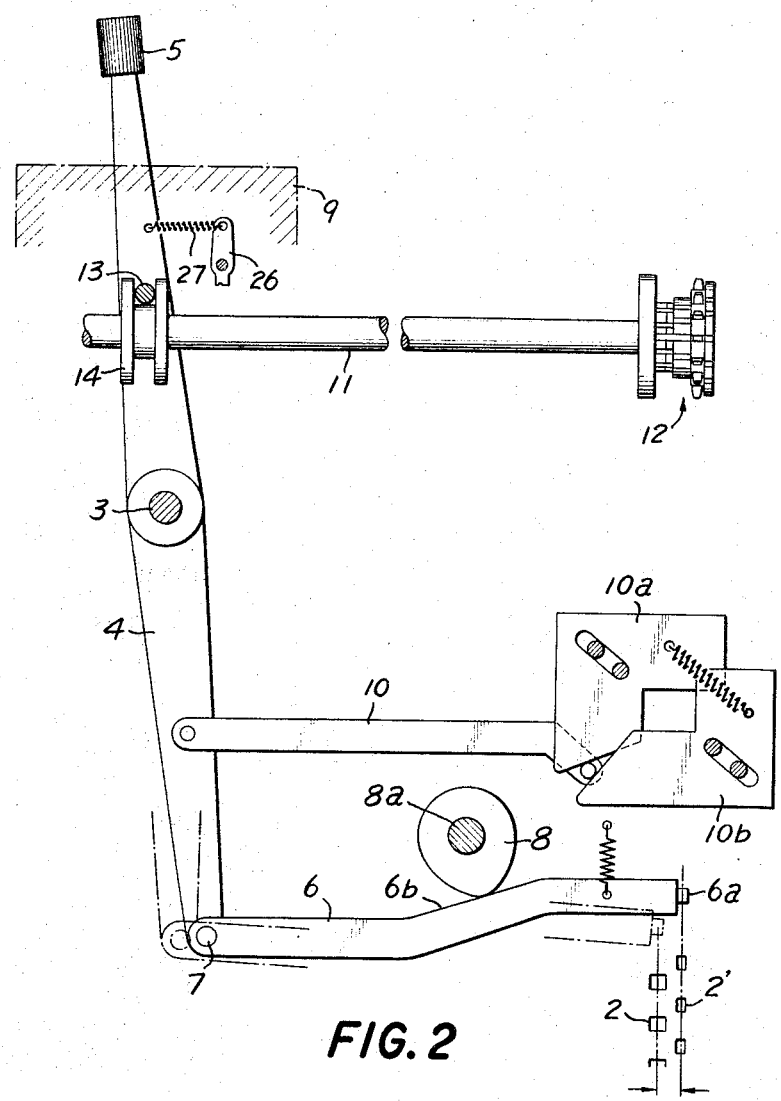
FIG. 2 shows general arrangement of the adjusting mechanism in accordance with the present invention.

When the lever 4 is placed in a position shown by chain lines in FIG. 2, the claw 6a of the arm 6 comes on the series of the perforations 2 of the ordinary film 1 and reciprocates with an amplitude $a$ through the engagement between the cam disc 8 and the arm 6. However, when the lever 4 is placed in a position shown by full lines in FIG 2, the claw 6a is moved toward right until it comes on the series of perforations 2'. With this movement, the amplitude with which the claw 6a reciprocates is increased because of the fact that the arm 6 moves relative to the cam disc 8 and the point at which the arm 6 engages with the cam 8 moves toward the pivot point 7 to alter the lever ratio.

It is to be noted that the amount of increase in the amplitude can be precisely controlled by means of the slope of the edge portion 6b. In other words, if the slope is steeper, greater increase in the amplitude of reciprocal movement of the claw 6a is obtained relative to the movement of the arm 6, and vice versa. In the present embodiment, the movement of the arm 6 is selected equal to 0.9 mm., and increase in the amplitude of reciprocal movement of the claw 6a is selected equal to 0.4 mm.

In FIG. 2, the area of the projected scene is adjusted by axial movement of the arm 10 which operates a pair of mask plates 10a and 10b to and from each other in response to the movement of the lever 4.

As illustrated in FIG. 2, a film drive shaft 11 having a sprocket assembly 12 at its one end engages at the other end with the lever 4 by means of a pair of spaced flanges 14 on the shaft 11 and pin 13 provided on the lever 4. The shaft 11 is slidably mounted on the casing 9 for axial movement in response to the movement of the lever 4 and controls the pitch of the sprocket teeth as described below. The shaft 11 is rotatable and is arranged to be driven by a suitable power source (not shown).

The sprocket assembly 12 includes a drum portion 11a provided on the end of the shaft 11. Said drum portion 11a has two cylindrical lands, i.e., a large diameter land 15 and a small diameter land 16, both of which are interrupted by a plurality of circumferentially spaced grooves 17. Each of said grooves 17 has an inclined bottom 17a on which a claw lever 19 rests.

A sleeve 22 is slidably mounted on the shaft 11 and pressed toward left by means of a spring 24 interposed between it and the drum portion 11a so as to abut the end surface 9a of the casing 9. A support member 20, which is axially slidable on the sleeve 22 and biased toward left by a spring 23 acting between it and the end flange of the sleeve 22, has a plurality of claw levers 19 arranged with equal circumferential spacings and pivotally mounted thereon at their ends. Each lever 19 extends through one of the openings 22a of the sleeve 22 into one of the grooves 17. All levers 19 are inwardly urged by a ring spring 21 so as to rest, at their ends remote from the pivot points on the inclined bottom 17a. Each lever 19 has a claw tip 19a projecting radially outwardly from one of the grooves 17 to define a tooth of the film drive sprocket. A lever 26 is pivotally mounted on the casing 9 and has a roller 25 on its one end for engagement with the end surface of the support member 20, the other end of which is connected with the lever 4 through a spring 27.

Figure 3:
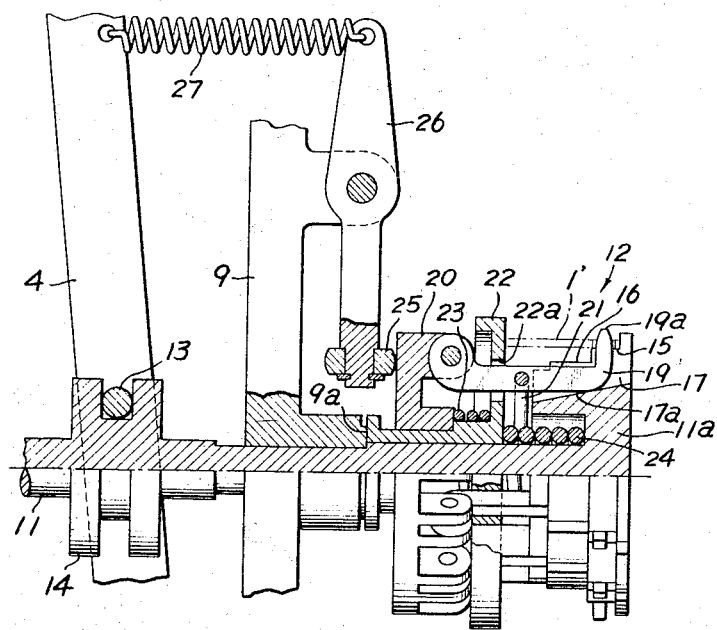
FIG. 3 is a partially cross-sectional elevation of the driving sprocket assembly in which all components are positioned to accommodate the enlarged screen film.
Figure 4:
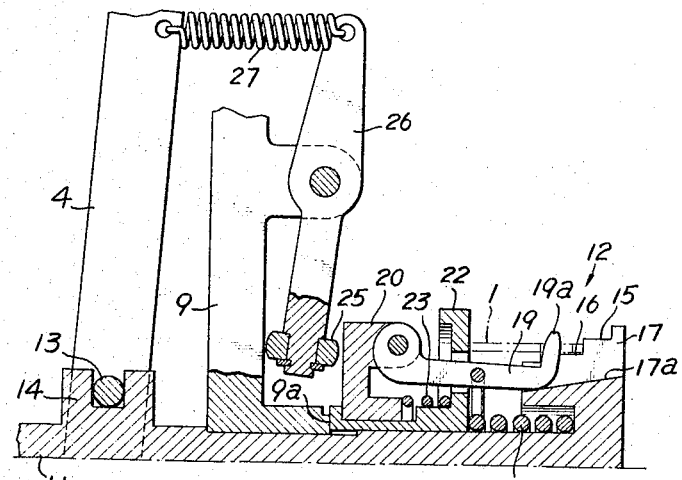
FIG. 4 is a partially cross-sectional elevation of the driving sprocket assembly shown in FIG. 3, but in which all components are displaced to accommodate the ordinary film.

Thus, when the lever 4 is moved counter-clockwise as shown in FIG. 3, the shaft 11 and thus the drum portion 11a is moved toward left against the action of the spring 24, and at the same time, the support member 20 is pressed toward right by means of the spring 27, the lever 26 and the roller 25. Thus, the drum portion 11a and the support member 20 moves toward each other whereby the claw levers 19 are caused to expand radially outwardly against the action of the ring spring 21 due to the slope of the bottom 17a. It is to be noted that, in this expanded position, the claws 19a project from the large diameter land 15 so as to define a large sprocket with teeth pitch of ($X=a+0.4$) as shown by chain lines in FIG. 5. In this position, the sprocket assembly 12 can receive an enlarged frame film 1' which rests on the large diameter land 15 and is driven by the claws 19a.

Figure 5:
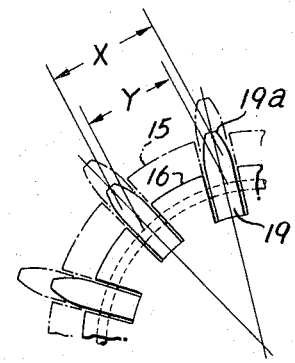
FIG. 5 is an end view of the driving sprocket assembly.

When the lever 4 is moved clockwise, the drum portion 11a is pushed toward right, while the support member 20 is released from the engagement with the roller 25 and moved toward left under the action of the spring 23. Thus, the claws of the levers 19 move radially inwardly under the action of the spring 21 and project from the small diameter land 16 to define a small sprocket with teeth pitch $Y=a$ as shown in FIG. 5.

In this position, the sprocket assembly can receive an ordinary film 1 which rests on the small diameter land 16 for driving engagement with the claws 19a.

Figure 6:
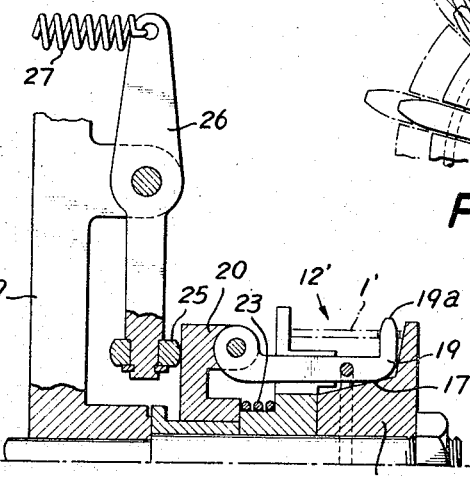
FIG. 6 is a cross-sectional view of a modified driving sprocket assembly.

FIG. 6 shows another embodiment of the sprocket means 12' in which the lands 15 and 16 and the grooves 17 are omitted from the drum portion 11a and the latter has a frusto-conical surface 17' in lieu of the inclined bottom 17a. The shaft 11 and therefore the drum portion 11a is rotatable about its axis but is secured against axial movement. The operation of this sprocket means 12' is same as that of the means 12 except that the film has no seating surface such as the land 15 or 16.

As obvious from above description, it is possible by using the cine-projector provided with a film driving means in accordance with the present invention to project pictures recorded on the different types of movie films in the same manner.

The details of the structure may be modified substantially without departing from the spirit of the invention and it is intended to embrace all of such modifications as come within the scope of appended claims as contemplated.

What I claim is:

1. A film driving means for a cine-projector comprising a sprocket means and an intermittent film driving means, said driving means including a pivotally mounted claw arm having a claw for engagement with perforations of said film and a cam operatively connected to drive said claw arm, said sprocket means being adjustable in teeth pitch in response to actuation of an operating lever, the pivot point of said claw arm being movable relative to said cam in response to actuation of said operating lever so as to change the position and the swing amplitude of said arm, whereby said film driving means can be used with different types of films having different perforations through simple adjustment.

2. A film driving means as described in claim 1, wherein said claw arm is pivotally mounted on said operating lever and is configured at the area which engages with said driving cam so that the desired swing amplitude change of the claw arm relative to the position change can be obtained.

3. A film driving means as described in claim 1, wherein said sprocket means comprises a plurality of radially directed sprocket teeth, each of said teeth being seated on a surface that is inclined relative to the axis of the sprocket means and being axially movable in relation to said inclined surface, said axial movement being effective to move said sprocket teeth radially so as to change the teeth pitch.

4. A film driving means as described in claim 3, wherein each of said teeth is formed at one end of a claw lever which is pivotally mounted on an axially slidable support member, and the sprocket drive shaft is provided with a drum portion having a plurality of axial grooves each of which has inclined bottom to provide a seat for one of said claw levers.

5. A film driving means as described in claim 4, wherein said drum portion is provided with a large and a small diameter cylindrical land to receive an appropriate film being driven, said lands being interrupted by said grooves.

6. A film driving means as described in claim 3, wherein each of said teeth is formed at one end of a claw lever which is pivotally mounted on an axially slidable support member, and the sprocket drive shaft is provided with a drum portion having a conical surface which defines the seats for said claw levers.

References Cited

UNITED STATES PATENTS

| 2,374,318 | 4/1945 | Wurger | 226—65 |
| 2,484,348 | 10/1949 | Kellogg et al. | 226—65 |
| 3,053,142 | 9/1962 | Wittel | 352—79 |

M. HENSON WOOD, JR., *Primary Examiner.*

J. N. ERLICH, *Assistant Examiner.*